United States Patent [19]

La Rosa et al.

[11] Patent Number: 5,490,177
[45] Date of Patent: Feb. 6, 1996

[54] METHOD AND APPARATUS FOR DETERMINING SIGNAL QUALITY

[75] Inventors: Christopher P. La Rosa, Lake Zurich; Michael J. Carney, Schaumburg, both of Ill.

[73] Assignee: Motorola, Inc., Schaumburg, Ill.

[21] Appl. No.: 216,751

[22] Filed: Mar. 23, 1994

[51] Int. Cl.⁶ .................................. H04L 27/22
[52] U.S. Cl. ............................ 375/329; 375/340
[58] Field of Search ................... 375/78, 80, 10, 375/83, 86, 94, 39, 44, 52, 53, 271, 279, 280, 322, 324, 329, 332, 340, 261, 224; 371/43; 329/304

[56] References Cited

U.S. PATENT DOCUMENTS

| | | | |
|---|---|---|---|
| 4,263,670 | 4/1981 | Sherman | 375/84 |
| 4,669,091 | 5/1987 | Nossen | 375/51 |
| 5,193,102 | 5/1993 | Meidan et al. | 375/1 |

FOREIGN PATENT DOCUMENTS 2-253727  10/1990  Japan .

Primary Examiner—Stephen Chin
Assistant Examiner—Tesfaldet Bocure
Attorney, Agent, or Firm—John J. King

[57] ABSTRACT

A unique method and apparatus determines signal quality and/or bit reliability information for a plurality of phase modulated information symbols. This is accomplished by first detecting the phase of the received phase modulated signal (201). The resulting phase estimate is then compared against the nearest expected phase value to form a phase error signal (202). The phase error signal is then mapped into a symbol quality estimate (205/206), which is then averaged over multiple symbol intervals to form a signal quality indicator (207). Finally, bit reliability information is generated by weighting the in-phase (I) and quadrature (Q) components of the phase estimate by the derived signal quality indicator (209). With such a method and apparatus, signal quality and/or bit reliability information can be determined without the need for signal amplitude information.

22 Claims, 2 Drawing Sheets

METHOD AND APPARATUS FOR DETERMINING SIGNAL QUALITY

FIELD OF THE INVENTION

The present invention is generally related to a method and apparatus for determining signal quality, and more particularly, for determining bit reliability information for phase modulated signals.

BACKGROUND OF THE INVENTION

Binary convolutional coding has been applied to the US Digital Cellular (USDC) and Japan Digital Cellular (JDC) systems to provide improved bit error rate (BER) performance. Convolutional codes are typically decoded using the Viterbi algorithm, which can utilize either hard-decision or soft-decision information. A hard-decision decoder operates on receiver bit decisions and uses Hamming distance as its confidence metric. Soft-decision decoding, on the other hand, operates on unquantized demodulator output values. Because it utilizes available channel quality information, soft-decision decoding provides superior BER performance relative to hard-decision decoding.

For a linear receiver, soft-decision information is typically generated by sampling the demodulator output at the symbol rate. This provides both amplitude and phase information which the Viterbi decoder can utilize in forming its confidence metric. In addition to requiring a linear receiver, this approach has another disadvantage: it is sensitive to the removal of some or all of the fading envelope due to automatic gain control (AGC). If the AGC gain varies over the effective memory length of the decoder, the detector output has to be remodulated with the removed fading envelope in order to obtain the full soft-decision performance gain.

For digital phase modulation schemes such as π/4 QPSK, a limited receiver structure is often preferred. In this case, the sampled demodulator output alone would provide inferior soft-decision decoding information because all amplitude information (including the fading envelope) has been removed. As a result, the demodulator output is typically scaled by measured received signal strength information (RSSI). This approach, however, requires additional circuitry (including an analog-to-digital converter to digitize the RSSI) and complicates the interface between the demodulator and the rest of the receiver.

Accordingly, there is a need for a method and apparatus for generating effective soft-decision information without signal amplitude information.

DESCRIPTION OF THE PREFERRED EMBODIMENT

Generally, the present invention provides a method and apparatus for determining signal quality and/or bit reliability information for a plurality of phase modulated information symbols. This is accomplished by first detecting the phase of the received phase modulated signal. The resulting phase estimate is then compared against the nearest expected phase value to form a phase error signal. The phase error signal is then mapped into a symbol quality estimate, which is then averaged over multiple symbol intervals to form a signal quality indicator. Finally, bit reliability information is generated by weighting the in-phase (I) and quadrature (Q) components of the phase estimate by the derived signal quality indicator. With such a method and apparatus, signal quality and/or bit reliability information can be determined without the need for signal amplitude information.

Figure 1:
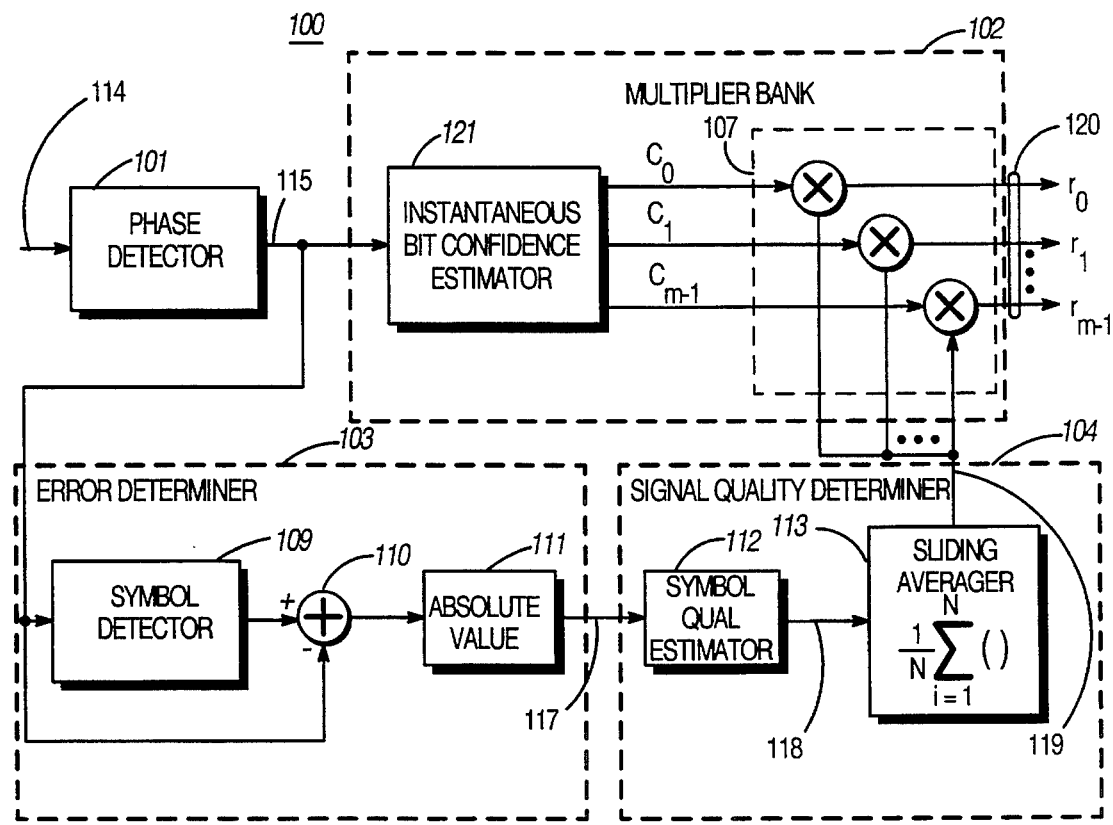
FIG. 1 is a block diagram of a receiver 100 incorporating the present invention.

The present invention can be more fully described with reference to FIGS. 1–4. FIG. 1 illustrates a receiver (100) that includes a phase detector (101), bit reliability determiner (102), error determiner (103), and a signal quality determiner (104). The bit reliability determiner (102) contains an instantaneous bit confidence estimator (121). At the output of the instantaneous bit confidence estimator (121) is a multiplier bank (107). The error determiner (103) contains a symbol detector (109), a subtractor (110), and a magnitude extractor (111). Finally, the signal quality determiner (104) contains a symbol quality estimator (112) and a sliding averager (113).

The elements in FIG. 1 can be implemented using a variety of techniques known to those skilled in the art. For example, the receiver (100) can be implemented using either a DSP or a custom integrated circuit. The phase detector (101) can consist of an analog-to-digital converter (ADC) followed by a table look-up algorithm that extracts the phase estimate (115) from the ADC output. Alternatively, the phase detector (101) can be implemented using a direct phase digitizer circuit composed entirely of digital hardware gates. The bit reliability determiner (102), the error determiner (103), and signal quality determiner (104) can be realized with digital hardware circuits, DSP algorithms, or table look-up methods. For the case of QPSK signalling, the combined functions of the phase detector (101) and the instantaneous bit confidence estimator (121) can be implemented using an analog direct baseband conversion circuit to produce the in-phase component (I) and the quadrature component (Q) from the phase modulated signal (114).

FIG. 1 provides a block diagram corresponding to a method and apparatus for determining signal quality and/or bit reliability information from a phase modulated signal. The digitally phase modulated signal (114) is applied as an input to the phase detector (101). The phase detector (101) generates a phase estimate signal (115). The phase estimate signal (115) can represent the absolute phase of the modulated signal (114) or the phase shift of the modulated signal (114) over a symbol interval. In the preferred embodiment, the phase estimate signal (115) represents the phase shift of the modulated signal (114) over one symbol period. The phase estimate signal (115) is applied as an input to the error determiner (103) and the bit reliability determiner (102).

The error determiner (103) compares the phase estimate (115) to the nearest expected phase value to form a phase error signal (117). This is accomplished by applying the phase estimate signal (115) as an input into the symbol detector (109). The output of the symbol detector (109) is the nearest expected phase value. This expected phase value is subtracted from the phase estimate (115) using the subtractor (110) to produce a phase difference signal. The magnitude extractor (111) determines the magnitude of the phase difference signal to produce the phase error signal (117). In the preferred embodiment, large values of the phase error signal (117) correspond to a symbol having an instantaneously poor signal quality; conversely, small values of the phase error signal (117) correspond to a symbol having a good instantaneous signal quality. The phase error signal (117) at the output of the error determiner (103) is provided as the input to the signal quality determiner (104).

The signal quality determiner (104) maps the phase error signal into a symbol quality estimate, which is then averaged over multiple symbol intervals to form an average measure of signal quality. First, the symbol quality estimator (112) translates the phase error signal (117) into the symbol quality estimate (118), which provides a measure of signal quality on a symbol-by-symbol basis. In the preferred embodiment, large phase error signals are mapped to small symbol quality estimate values. Next, the symbol quality estimate (118) is input to the sliding averager (113), which determines the average value of the symbol quality estimate over a predetermined number of symbol intervals. The resulting signal quality indicator (119) provides an average measure of signal quality. The signal quality indicator (119) increases in magnitude as signal quality improves. In the preferred embodiment, the signal quality indicator is used as an input to the bit reliability determiner (102).

In general, for M-ary modulation there will be m bits per symbol, where m is the base-two logarithm of M. In this case the instantaneous bit confidence estimator (121) produces m signals, with each signal corresponding to an individual bit of the received symbol. The m signals provide a measure of bit reliability on a symbol by symbol basis. Each of the m outputs of the instantaneous bit confidence estimator are weighted by the signal quality indicator (119) using m multipliers in multiplier bank 107. The bit reliability determiner (102) outputs m reliability signals. In the preferred embodiment, M equals 4 and m equals 2.

Figure 2:
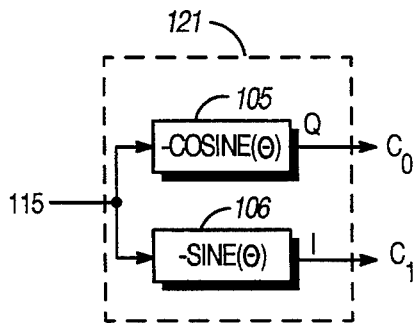
FIG. 2 is an example of an instantaneous bit confidence estimator 121 shown in FIG. 1.

FIG. 2 illustrates an instantaneous bit confidence estimator (121) for use with the receiver 100 of FIG. 1 for a system that encodes 2 bits per symbol. The preferred bit confidence estimator (121) generates the in-phase (I) and quadrature (Q) components of the phase estimate. The phase estimate signal (115) is converted to in-phase (I) and quadrature (Q) components by the negative sine converter (106) and the negative cosine converter (105), respectively. The I and Q signals provide a measure of bit reliability on a symbol-by-symbol basis. To incorporate a long-term measure of signal quality, the I and Q signals are weighted by the signal quality indicator (119) using multiplier bank (107). The output of the multipliers is the bit reliability information (120).

Figure 3:
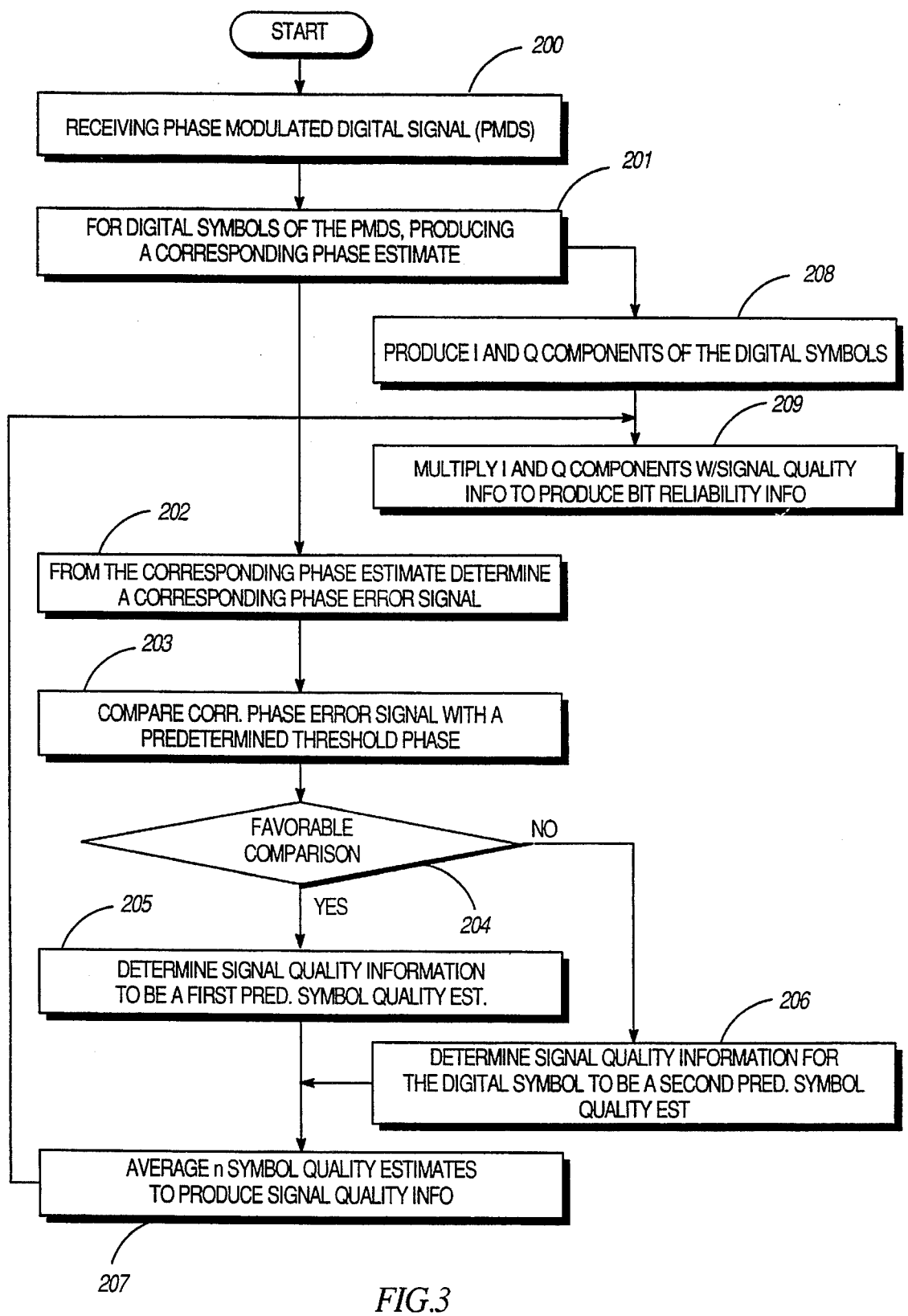
FIG. 3 is a flow chart for the method for determining signal quality according to the present invention.

FIG. 3 illustrates a logic diagram that may be used to implement the present invention. At step 200, a digitally phase modulated signal is received. Modulation schemes that produce digitally phase modulated signals include phase-shift keying (PSK), frequency-shift keying (FSK), and differentially encoded pi/4-shifted quadrature phase-shift keying (pi/4 DQPSK). The steps of FIG. 3 are specific to a modulation system that encodes two bits per symbol. However, it will be understood that any number of bits per symbol could be encoded. These signals are characterized by carrier waveforms having a phase that is altered in response to a baseband signal, which is derived from a stream of binary data. The data stream is partitioned into digital symbols having a predetermined number of bits; each symbol then impresses a distinct phase on the carrier waveform.

At step 201, a phase estimate corresponding to each digital symbol is extracted. In the preferred embodiment, the phase estimate is a measure of the phase shift of the modulated waveform over the corresponding symbol interval. Alternatively, the absolute phase of the modulated waveform could be used. Mathematically, the phase of the modulated waveform is equal to the arctangent of the ratio of the quadrature component of the modulated waveform to the in-phase component of the modulated waveform. The phase of the modulated waveform can be determined using a look-up table or computed directly with a direct phase digitizer.

By comparing the phase estimate to a predetermined expected phase value, a phase error signal (PES) is generated at step 202. The PES provides a symbol-by-symbol estimate of the quality of the digitally phase modulated signal. At step 203, the phase error signal is mapped to a symbol quality estimate (SQE), which provides an alternative measure of short-term signal quality. The appropriate mapping is chosen to better estimate the quality of the digitally phase modulated signal. More specifically, the PES can be compared to a predetermined number of thresholds. As the number of thresholds is increased, the resolution of the symbol quality estimate improves at the cost of added complexity. The value of the PES relative to these thresholds determines the weighting factor impressed on the value of the symbol quality estimate. In the preferred embodiment, the PES is compared to a single threshold, which can be optimized to improve performance.

Step 204 illustrates the PES threshold comparison of the preferred embodiment. If the PES is less than the predetermined threshold, the comparison is deemed favorable and the PES is mapped to a first predetermined symbol quality estimate at step 205. Conversely, an unfavorable comparison results if the PES exceeds the predetermined threshold, and as a result, a second predetermined symbol quality estimate is generated at step 206. In the preferred embodiment, the first predetermined SQE has a value of zero; the second predetermined SQE is assigned a value of one.

At step 207, the symbol quality estimate is averaged over a predetermined number (n) of symbol intervals. The resulting signal quality indicator (SQI) corresponds to a long-term measure of the quality of the digitally phase modulated signal. Although other equally sufficient weighting methods may be used, the preferred embodiment employs a sliding averager to produce the SQI. This sliding averager equally weights the incoming SQE with the previous n-1 estimates of symbol quality. The number n is selected to optimize performance based on channel conditions. More specifically, as the fluctuation in signal amplitude caused by Rayleigh fading increases in frequency, n is reduced to track the changing channel conditions. On the other hand, n is increased as the fading rate decreases. This increase in the number of averaged samples mitigates the effects of an inaccurate phase estimate produced by random noise.

The extraction of the in-phase (I) and quadrature (Q) components of the phase estimate is accomplished at step 208. As an example, for the generalized M-ary modulation scheme having m bits per symbol, m signals are generated. Each signal provides an instantaneous measure of bit reliability on a symbol by symbol basis. For the phase mapping illustrated in FIG. 3, the I component is the negative sine of the phase estimate produced at step 201; the Q component is the negative cosine of the phase estimate. For alternative phase mappings, the I and Q components can be derived based on the degree of confidence that a received bit in a symbol matches its corresponding transmitted bit. This degree of confidence is established on a symbol-by-symbol basis depending on the location of the phase estimate relative to the expected phase values.

At step 209, the long-term signal quality information (SQI) is used to weight the short-term bit-reliability information contained within the I and Q components. In the preferred embodiment, this weighting can be accomplished by multiplying the I and Q components with the SQI. The result is the desired bit reliability information.

Figure 4:
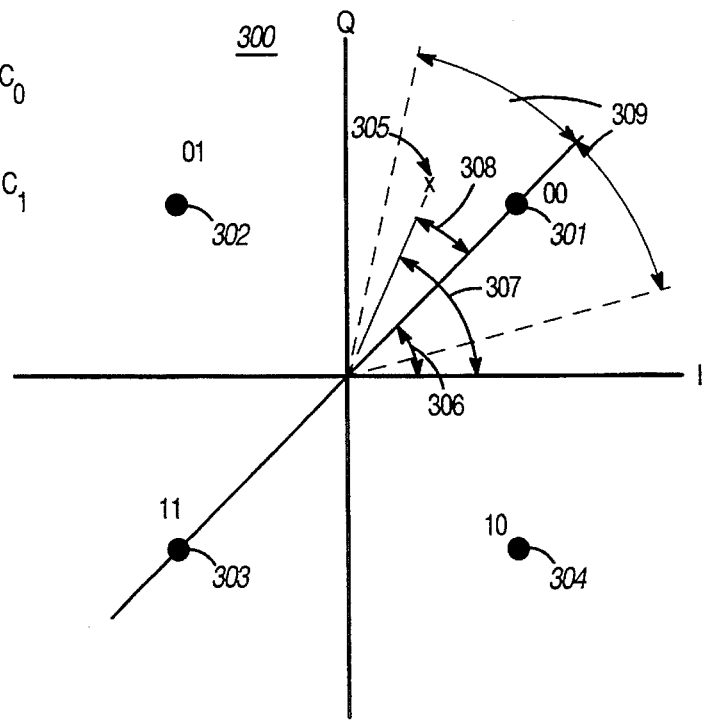
FIG. 4 is a phasor diagram illustrating the present invention.

FIG. 4 illustrates a working example of the above described process. The QPSK constellation (300) includes the expected constellation points 301, 302, 303, and 304. Expected constellation point 301 is mapped to binary digits (B1, B0=00) and has an expected phase value (306) of pi/4. Point 302 is mapped to binary digits (B1, B0=01) and has an expected phase value of 3pi/4. Binary digits (B1, B0=11) are assigned to constellation point 303, which has an expected phase value of −3pi/4. Finally, constellation point 304 has an expected phase value of −pi/4 and is mapped to binary digits (B1, B0=10). The QPSK constellation (300) contains an example of a received constellation point (305), which is an instantaneous I/Q representation of a digitally phase modulated signal. Also included in FIG. 3 are the phase estimate (307) and phase error (308) corresponding to the received constellation point (305). An example of a predetermined phase threshold is denoted by 309.

By determining the angle between received constellation point (305) and the horizontal or 1 axis, the phase estimate (307) is determined. The phase error (308) is computed as the magnitude of the difference between the phase estimate (307) and the nearest expected phase value. For the example constellation point (305), the nearest expected phase value is pi/4, which corresponds to constellation point (301). The symbol quality estimate is determined by comparing the phase error (308) to the magnitude of the phase threshold (309). If the phase error exceeds the threshold, then the symbol quality is regarded as poor, and the symbol quality estimate is assigned a value of 0. On the other hand, symbol quality is considered good if the magnitude of the phase error (308) is less than the magnitude of the phase threshold (309). As a result, the symbol quality estimate is assigned a value of 1. To provides a long-term measure of the quality of a received signal, the symbol quality values are averaged over a predetermined number (n) of symbol intervals to generate the signal quality indicator.

The generation of the in-phase (I) and quadrature (Q) components used by the bit reliability determiner is also illustrated in FIG. 4. The I component is computed as the negative sine of the phase estimate, and the Q component is computed as the negative cosine of the phase estimate. Therefore, the I and Q components range in value from −1 to +1. A value of +1 indicates that a received bit equals one with a high degree of certainty, and a value of −1 indicates that a received bit equals zero with a high degree of certainty. When the I or Q components are near 0, the value of a received bit is regarded as uncertain. To conform to the mapping of FIG. 4, the I component is assigned as the instantaneous bit reliability estimate for bit B1, and the Q component is assigned as the instantaneous bit reliability estimate for bit B0. As an example, the received constellation point (305) is located between expected points 301 (B1, B0=00) and 302 (B1, B0=01). Since B1 is mapped to a 0 for points 301 and 302, the received constellation point (305) will have a value of B1=0 with a high degree of certainty. This validates the assignment of the I component, which has a value close to −1 in this region, to bit B1. Since B0 is mapped to a value of 0 at point 301 and a value of 1 at point 302, the value of B0 will be uncertain for the received constellation point(305), which is located approximately midway between these expected points. This validates the assignment of the Q component, which has a value near zero in this region, to bit B0.

Along with the I and Q components, the signal quality indicator is used to determine the bit reliability information. The signal quality indicator is combined with the Q component to determine the reliability of bit B0, and the signal quality indicator is combined with the I component to determine the reliability of bit B1.

The present invention provides a method and apparatus for determining signal quality and/or bit reliability information for a plurality of phase modulated information symbols. With such a method and apparatus the signal quality and/or bit reliability information can be generated without signal amplitude information. As a result, the processing circuitry required to determine received signal strength, as well as the circuitry required to perform analog-to-digital conversion, can be eliminated. Furthermore, because the invention does not require amplitude information, the complexity of the detector interface to the receiver is reduced significantly.

We claim:

1. In a receiver that receives a plurality of phase modulated digital symbols, a method for providing signal quality information of the plurality of phase modulated digital symbols, the method comprising the steps of:

a) for each phase modulated digital symbol of at least some of the plurality of phase modulated digital symbols, producing a corresponding phase estimate;

b) determining a corresponding phase error signal from the phase estimate;

c) determining a symbol quality estimation based on the phase error signal; and d) determining the signal quality information of the plurality of phase modulated digital symbols based on a predetermined number of determined symbol quality estimations.

2. The method for providing signal quality information of claim 1 wherein the step of producing a corresponding phase estimate includes generating a limited intermediate frequency signal.

3. The method for providing signal quality information of claim 2 wherein the step of producing a corresponding phase estimate includes detecting the phase of the limited intermediate frequency signal.

4. The method for providing signal quality information of claim 1 wherein said step of determining a phase error signal includes comparing the phase estimate to a predetermined phase.

5. The method for providing signal quality information of claim 1 wherein said step of determining a symbol quality estimation includes comparing the corresponding phase error signal to a predetermined threshold for the phase error signal.

6. The method for providing signal quality information of claim 5 wherein the step of determining a symbol quality estimation includes generating a first predetermined value when the phase error signal is greater than the predetermined threshold and generating a second predetermined value when the phase error signal is less than the predetermined threshold.

7. The method for providing signal quality information of claim 1 wherein said step of determining signal quality information includes averaging the predetermined number of symbol quality estimations.

8. The method for providing signal quality information of claim 1 further including a step generating bit reliability information based upon the signal quality information.

9. The method for providing signal quality information of claim 8 wherein the step of generating bit reliability information includes generating a plurality of signals based upon the signal quality information and the phase estimate.

10. The method for providing signal quality information of claim 8 wherein the step of generating bit quality information includes generating an in-phase component and a quadrature component, both the in-phase component and the quadrature component being based upon the signal quality information and the phase estimate.

11. The method for providing signal quality information of claim 1 wherein said step of producing a corresponding phase estimate includes generating a corresponding phase estimate for each of said plurality of phase modulated digital symbols.

12. In a receiver that receives a plurality of phase modulated digital symbols, a method for generating bit reliability information of the plurality of phase modulated digital symbols, each phase modulated digital symbol having associated therewith phase information, the method comprising the steps of:

a) for each digital symbol of at least some of the plurality of phase modulated digital symbols, determining a symbol quality estimation based on the associated phase information;

b) determining signal quality information of the plurality of phase modulated digital symbols based on a predetermined number of determining symbol quality estimations; and c) said generating bit reliability information based upon the signal quality information and the phase information.

13. The method for providing bit reliability information of claim 12 wherein the step of determining a symbol quality estimation includes determining the phase error by comparing the phase information to predetermined phase information.

14. The method for providing bit reliability information of claim 12 wherein said step of determining a symbol quality estimation includes comparing a phase error signal associated with each digital symbol to a predetermined threshold for the phase error signal.

15. The method for providing bit reliability information of claim 12 wherein said step of determining signal quality information includes averaging the predetermined number of symbol quality estimations.

16. The method for providing bit reliability information of claim 12 wherein the step of generating bit reliability information includes generating a plurality of signals based upon the signal quality information and the phase information.

17. The method for providing bit reliability information of claim 12 wherein the step of generating bit quality information includes generating an in-phase component and a quadrature component.

18. A circuit for generating bit reliability information for phase modulated digital symbols comprising:

a phase detector adapted to receive said phase modulated digital symbols for generating a phase estimate for each said phase modulated digital symbol;

an error determiner coupled to receive said phase estimate, said error determiner generating a phase error signal;

a signal quality determiner coupled to receive said phase error signal, said signal quality determiner generating a signal quality indicator; and a bit reliability indicator coupled to receive said signal quality indicator and said phase estimate and generate bit reliability information.

19. The circuit for generating bit reliability information of claim 18 wherein said phase estimate is generated from a limited intermediate frequency signal.

20. The circuit for generating bit information of claim 18 wherein the error determiner includes a symbol detector coupled to receive said phase estimate and an adder circuit coupled to said symbol detector for subtracting an expected phase value from the phase estimate.

21. The circuit for generating bit information of claim 18 wherein said signal quality determiner includes a symbol quality estimator coupled to receive said phase error signal and generate symbol quality estimates and an averaging circuit coupled to said symbol quality estimator.

22. The circuit for generating bit reliability information of claim 18 wherein said bit reliability indicator includes a combiner circuit coupled to receive the signal quality indicator and the phase estimate and generate a bit reliability information signal.

\* \* \* \* \*